(12) United States Patent
Kaushik et al.

(10) Patent No.: US 7,191,349 B2
(45) Date of Patent: Mar. 13, 2007

(54) MECHANISM FOR PROCESSOR POWER STATE AWARE DISTRIBUTION OF LOWEST PRIORITY INTERRUPT

(75) Inventors: Shivnandan D. Kaushik, Portland, OR (US); John W. Horigan, Mountain View, CA (US); Alon Naveh, Ramat Hasharon (IL); James B. Crossland, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 421 days.

(21) Appl. No.: 10/330,622

(22) Filed: Dec. 26, 2002

(65) Prior Publication Data

US 2004/0128563 A1 Jul. 1, 2004

(51) Int. Cl.
G06F 1/00 (2006.01)
G06F 1/30 (2006.01)
G06F 1/32 (2006.01)

(52) U.S. Cl. .................. 713/323; 713/300; 713/320; 713/322; 713/324

(58) Field of Classification Search ............ None
See application file for complete search history.

(56) References Cited

U.S. PATENT DOCUMENTS

| | | | |
|---|---|---|---|
| 5,696,976 A * | 12/1997 | Nizar et al. | 710/266 |
| 5,758,169 A | 5/1998 | Nizar et al. | |
| 5,828,568 A | 10/1998 | Sunakawa et al. | |
| 5,918,057 A | 6/1999 | Chou et al. | |
| 6,823,413 B2 * | 11/2004 | Fujiki | 710/260 |
| 6,845,456 B1 * | 1/2005 | Menezes et al. | 713/320 |
| 6,904,595 B2 * | 6/2005 | Alford et al. | 718/102 |
| 2001/0052043 A1 * | 12/2001 | Pawlowski et al. | 710/260 |
| 2002/0124196 A1 * | 9/2002 | Morrow et al. | 713/320 |
| 2004/0010667 A1 * | 1/2004 | Brenner | 711/158 |

OTHER PUBLICATIONS

PCT International Search Report for PCT International Application No. US03/38612, mailed Oct. 1, 2004 (6 pages).

* cited by examiner

*Primary Examiner*—James K. Trujillo
(74) *Attorney, Agent, or Firm*—Ted A. Crawford

(57) ABSTRACT

A method for a mechanism for processor power state aware distribution of lowest priority interrupts. The method of one embodiment comprises receiving first power state information from a first component and second power state information from a second component. First task priority information from the first component and second task priority from the second component are also received. An interrupt request from a first device for servicing is received. Power state and task priority information for the first and second components are evaluated to determine which component should service the interrupt request. Either the first component or the second component is selected to be a destination component to service the interrupt request based on the power state and task priority information. The interrupt request is communicated to the destination component.

36 Claims, 8 Drawing Sheets

MECHANISM FOR PROCESSOR POWER STATE AWARE DISTRIBUTION OF LOWEST PRIORITY INTERRUPT

FIELD OF THE INVENTION

The present invention relates generally to the field of microprocessors and computer systems. More particularly, the present invention relates to a method and apparatus for a mechanism for processor power state aware distribution of lowest priority interrupts.

BACKGROUND OF THE INVENTION

Computer systems have become increasingly pervasive in our society. The processing capabilities of computers have increased the efficiency and productivity of workers in a wide spectrum of professions. As the costs of purchasing and owning a computer continues to drop, more and more consumers have been able to take advantage of newer and faster machines. Furthermore, many people enjoy the use of notebook computers because of the freedom. Mobile computers allow users to easily transport their data and work with them as they leave the office or travel. This scenario is quite familiar with marketing staff, corporate executives, and even students.

A similar phenomenon has occurred with desktop and server machines. As newer designs and features develop, the computational capabilities of processors continue to grow exponentially. Computer designs for both the mobile and desktop arena are gradually migrating towards the use of multi-core or multi-threading processors that can perform a number of applications and task at the same time. Some systems are also being built with multiple physical processors. However, the price tag for increased compute power also includes real power costs. In other words, the power consumption in these machines becomes extremely large. Thermal considerations can also become important because of the relationship with power.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

Figure 1:
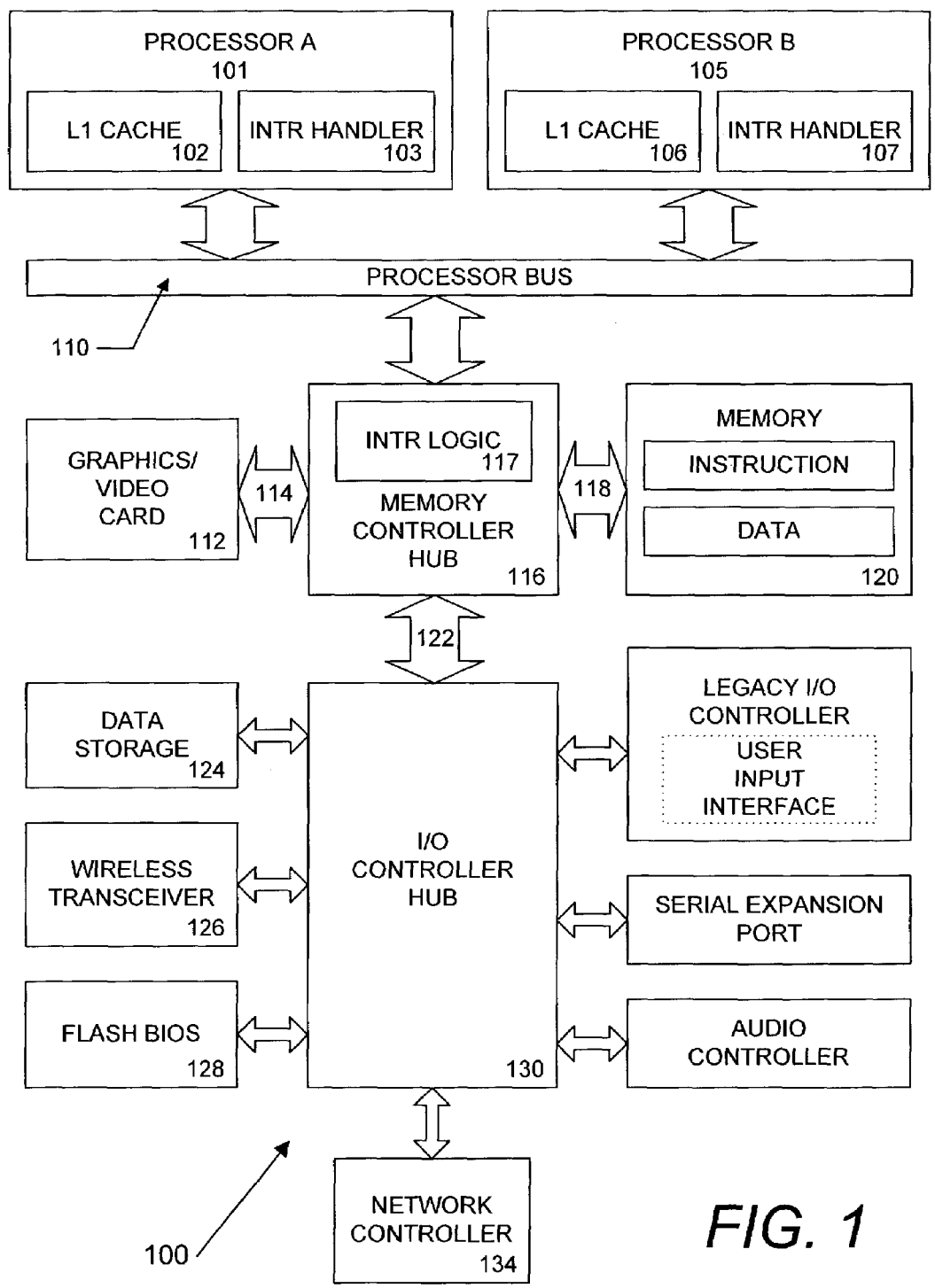
FIG. 1 is a block diagram of a multiprocessor computer system formed with a chipset and processors that include a mechanism for power state aware distribution of lowest priority interrupts in accordance with one embodiment of the present invention.

A method and apparatus for a mechanism for processor power state aware distribution of lowest priority interrupts is disclosed. The embodiments described herein are described in the context of a general purpose microprocessor and chipset, but are not so limited. Although the following embodiments are described with reference to a processor and chipset, other embodiments are applicable to other types of integrated circuits and logic devices. The same techniques and teachings of the present invention can easily be applied to other types of circuits or semiconductor devices that can benefit from power monitoring and improved interrupt handling. The teachings of the present invention are applicable to any processor or machine that performs interrupts. However, the present invention is not limited to a multi-processor system or multi-core processor module and can be applied to any microprocessor and machine on which multi-threading or multi-tasking can be performed.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention.

Technology advances have led to processor and application parallelism becoming more prevalent. Many servers and platforms are increasingly turning to threading as a way of increasing overall system performance. Many applications have been threaded, split into multiple streams of instructions, to take advantage of multiple processors. Multi-processing aware operating systems can schedule these threads for parallel processing across multiple processors within the system. Furthermore, thread level parallelism can also occur on each processor. Dual-or multi- processing applications in the areas of web serving, search engines, security, streaming media, and databases, for example, can take advantage of the increased processing power of multi-threading and multi-processor computer systems.

One type of multi-threading technology, such as Hyper-Threading technology, is a form of simultaneous multi-threading technology (SMT) where multiple threads of software applications can run simultaneously on one processor. This is achieved by duplicating the architectural state on each processor, while sharing one set of processor execution resources. The architectural state tracks the flow of a program or thread, and the execution resources are the units on the processor that do the work (i.e., add, multiply, load, etc.). In some multi-processor systems, each processor has its own set of processor execution resources and its own architectural state. In multi-threading capable multi-processor systems, the architectural state for each processor can be duplicated even though each processor still has one set of execution resources. When scheduling threads, the operating system treats the separate architectural states on each processor as a separate "logical" processor. Logical processors share nearly all other resources on the physical processor, such as caches, execution units, branch predictors, control logic, and buses. Like physical processors, each logical processor can respond to interrupts independently. One logical processor can track a first software thread, while another logical processor can track a second software thread simultaneously. Because multiple threads are sharing one set of execution resources, one thread can use resources that would be otherwise idle if the processor was executing only one thread. As a result, overall performance and system response can be improved.

Various ways to improve the power consumption and performance of a processor architecture can be desirable. One area of interest involves the handling and servicing of interrupt requests by processors from different system devices. In some systems, interrupts requests are managed by chipset logic. The chipset logic intercepts these requests and determines which processor to distribute the request to for service. In single processor systems, this is easy as the chipset has a single target. But with systems that include multiple physical and/or logical processors, the task of interrupt request distribution can become trickier as the chipset attempts to minimize the impact of interrupts on performance.

The advanced programmable interrupt controller (APIC) architecture allows for the delivery of a device interrupt to a processor that is operating at the lowest priority among a set of target processors. This processor priority is determined via the contents of the task priority register for those processors. This feature is based on the concept that the priority that a processor is presently running at represents the criticality of the task being performed. The higher the task priority, the less desirable it would be to interrupt that processor as there can be an undesirable impact on overall performance. Furthermore, by directing an interrupt to the processor operating at the lowest priority in the system would provide a better chance that the interrupt might be serviced with a minimal amount of wait time.

Current interrupt delivery mechanisms are unaware of processor power states and thus, do not know whether a target processor is in a power savings mode. These interrupt mechanisms are ignorant as to whether a processor is in an operating state or some type of sleep state (i.e., stop grant, deep sleep, etc.). As a result, interrupt service requests can targeted at a sleeping processor, which will cause the processor to wake up and exit out of the sleep mode into an operational mode in order to handle the interrupt. Because the processor sleep states are designed to save power, by waking up a sleeping processor to perform a task thwarts that objective. As multi-processor and multi-threaded configurations become more prevalent in both mobile and desktop computer systems, power saving techniques to avoid disturbances of other processor power saving modes when delivering interrupts can become more important.

Embodiments of the present invention enable low priority interrupt delivery schemes to take processor power savings states into account when determining where to send interrupt requests. By implementing embodiments of the present invention, a processor in deeper sleep state than another processor would be a less preferable target for a lowest priority interrupt. As a result, processors in sleep states can continue to slumber in their respective sleep states without interrupt, leading to better power savings.

For some embodiments, the operating system is responsible for controlling the power savings states, also referred to as C-states, that processors enter into in accordance with the ACPI specifications. The operating system or system management software can choose an appropriate power state depending on how idle a processor has been. Although a number of ACPI enabled operating systems are available, alternative embodiments of the present invention can also be implemented to work on so called "legacy" operating systems and machines that may not be ACPI enabled. Alternative embodiments of the present invention allow for capability to perform processor power state aware, lowest priority interrupt distribution with little or no software modifications in older systems. This can especially desirable in older ACPI enable operating systems that cannot be modified.

Referring now to FIG. 1, an exemplary computer system 100 is shown. System 100 includes a component, such as processors 101, 105 and chipset 116, 130 to employ a mechanism for power state aware distribution of interrupts in accordance with the present invention, such as in the embodiment described herein. System 100 is representative of processing systems based on the PENTIUM® III, PENTIUM® 4, Itanium™, and/or XScale™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, the present invention is not limited to any specific combination of hardware circuitry and software.

The present enhancement is not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other multiprocessor or multithreading system that use interrupts. Furthermore, some architectures have been implemented to reduce power consumption via low power states or sleep modes. As the form factors of electronic devices continue to shrink and the power demands of electronic components continue to increase, additional efforts are needed to conserve power while having minimal negative impact on performance.

FIG. 1 is a block diagram of a multiprocessor computer system 100 formed with a two processors, A 101 and B 105, that each includes interrupt handler logic 103, 107, in accordance with the present invention. The present embodiment is described in the context of a system including multiple physical processors, but alternative embodiments can be used with a multithreading processor wherein multiple logical processors exist on a single physical processor. Similarly, another embodiment of the present invention can be implemented with a multi-core module having multiple processor cores packaged together in a single module. System 100 is an example of a hub architecture. The computer system 100 includes processors 101, 105, to process data signals. The processors 101, 105, can be complex instruction set computer (CISC) microprocessors, reduced instruction set computing (RISC) microprocessors, very long instruction word (VLIW) microprocessors, processors implementing a combination of instruction sets, or any other processor devices, such as a digital signal processors, for example.

The processors 101, 105, are coupled to a processor bus 110 that can transmit data signals between the processors 101, 105, and other components in the system 100. The elements of system 100 perform their conventional functions that are well known to those familiar with the art. In one embodiment, the processors 101, 105, each include a Level 1 (L1) internal cache memory 102, 106. An interrupt handling mechanism 103, 107, also resides in the processors 101, 105. For one embodiment, the interrupt handler 103, 107, provide information regarding processor priority and power status. Alternate embodiments of a interrupt logic 103, 107, can also be used in micro controllers, embedded processors, graphics devices, DSPs, and other types of logic circuits. System 100 includes a memory 120.

A system logic chip 116 is coupled to the processor bus 110 and memory 120. The system logic chip 116 in the illustrated embodiment is a memory controller hub (MCH). The processors 101, 105, can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processors 101, 105, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114. For one embodiment, interrupt handler logic 117 is also located in the MCH 116, as the chipset receives interrupt requests from various system devices and distributes the interrupts to appropriate destinations for processing. For some systems, the chipset may poll devices for interrupts. The interrupt logic 117 for the MCH 116 of this embodiment takes into account the processor priority and the processor power state when distributing interrupts requiring processor handling. Other factors can also be considered in interrupt distribution depending on the particular implementation.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processors 101, 105. Some examples are the data storage 124, wireless transceiver 126, firmware hub (flash BIOS) 128, legacy I/O controller containing user input and keyboard interfaces, a serial expansion port such as Universal Serial Bus (USB), audio controller, and a network controller 134. The data storage device 124 can comprise a hard disk drive, a floppy disk drive, a CD-ROM device, a flash memory device, or other mass storage device. The various aforementioned devices coupled to both the MCH 116 and ICH 130 can all be capable of needing interrupt service. In addition, processors can also issue interrupts to other processors.

Embodiments of mechanisms in accordance with the present invention allow the conveyance of processor sleep state information to the chipset logic or system component responsible for the delivery of lowest priority interrupts. In some embodiments, the chipset logic is extended to use this processor sleep state information when selecting a destination processor from a set of available target processors in the system for the delivery of lowest priority interrupts. The mechanisms of one hardware based embodiment establishes a priority relationship between processor operating and sleeping states. The mechanism communicates this type of operating/sleep state information to the chipset via one or more bus cycles. The chipset for this embodiment is designed to receive the operating/sleep state information and to take the information into account during the interrupt distribution algorithm. In one software based embodiment, extension in the operating system allow processor sleep state information to be conveyed indirectly to the chipset or the system component response for interrupt delivery to the processor. With embodiments of the present invention, an operating system can ensure that processors in deeper sleeping states are less preferred targets for receiving lower priority interrupts, leading to better powering savings in multi-processor and multi-threading configurations. For one embodiment, this mechanism can be implemented primarily in hardware. Alternative embodiments of the present invention may be implemented primarily software without hardware changes. Furthermore, some embodiments may use be a hybrid combination of both hardware and software components. In yet another embodiment, a scheme including a combination of hardware and operating system software is configured wherein the operating system assigns processor task priority TPR values to individual processors based on the power state of that processor. For example, a lower power state (i.e., a higher numbered C state, like C2 and up as in FIG. 4 below) corresponds to a higher TPR value and that processor is assigned a higher TPR value accordingly. In other words, interrupts are discouraged from being sent to a processor in a low power state through the TPR values.

Figure 2:
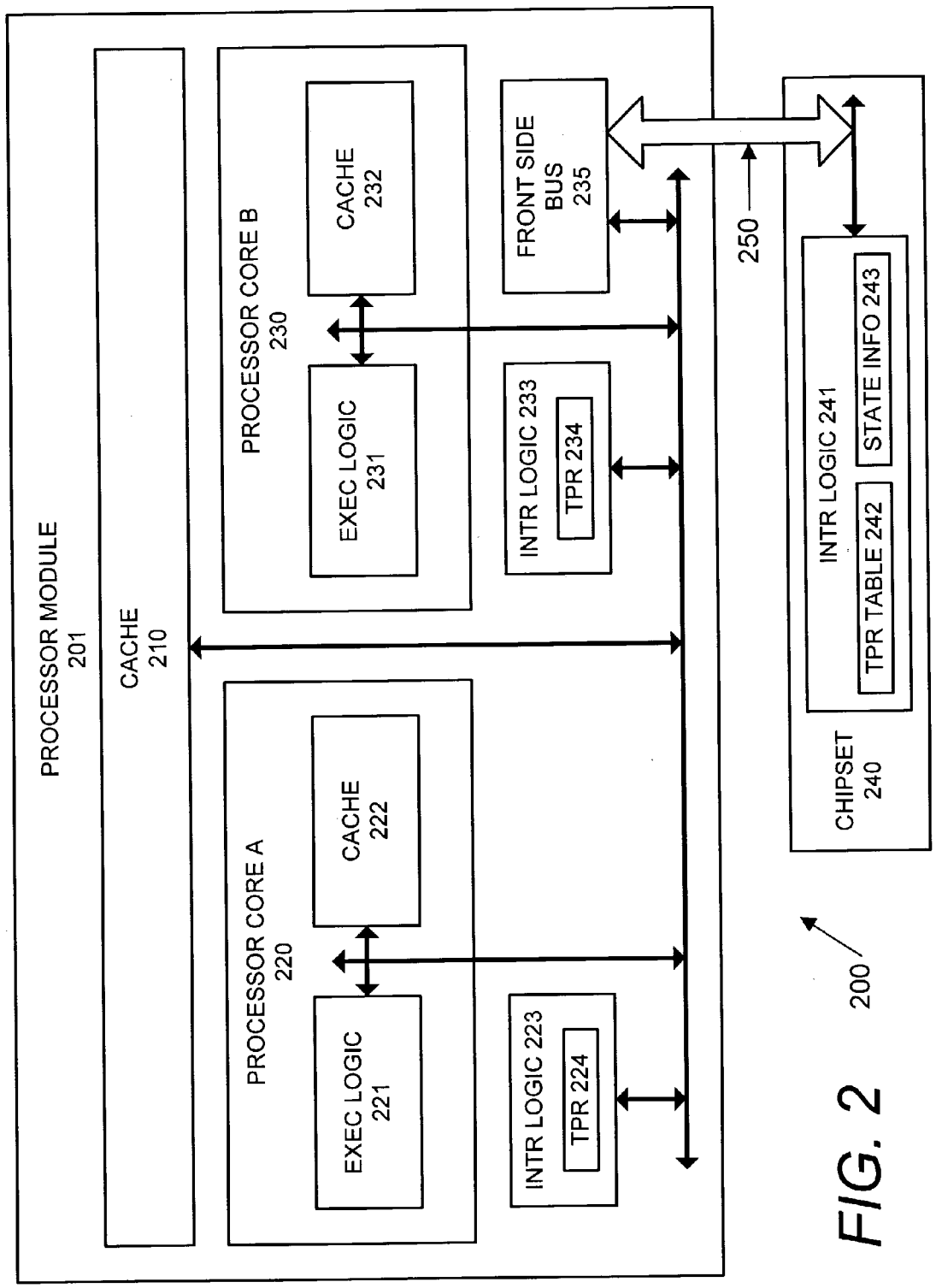
FIG. 2 is a block diagram of a multi-core processor module and associated chipset that include one embodiment of a power state aware interrupt mechanism of the present invention.

FIG. 2 is a block diagram 200 of a multi-core processor module 201 and associated chipset 240 that include one embodiment of a power state aware interrupt mechanism of the present invention. Multi-core processor module 201 of this embodiment includes two individual physical processor cores, A 220 and B 230. In this example, both cores 220, 230, are identical. Each core 220, 230, includes: execution logic 221, 231, to execute code and instructions; an internal on-die cache 222, 232, to store data and instructions and interrupt logic 223, 233, having a task priority register (TPR) 224, 234. In some embodiments, the Interrupt logic 223, 233, and associated TPRs 224, 234, may be located in the processor module 202, but off the cores 220, 230. A front side bus (FSB) unit 235 bridges the communications between the cores 220, 230 and with the outside world (i.e., external bus and cache) is also located within the module 201. A single shared FSB unit 235 is coupled to serve both processor core A 220 and processor core B 230 in this embodiment. In alternative embodiments, each core may have its own FSB unit. Similarly, in another embodiment, a single interrupt logic unit can be share by multiple processor cores, wherein a TPR register or entry for each core is maintained in that interrupt logic block. Although the interrupt logic 223, 233, are illustrated as separate blocks in the example of FIG. 2, the interrupt logic may also physically exist as one logic block but duplicated logically.

In addition to the two processor cores 220, 230, a cache 210 is resident within the processor module 201. The processor cores 220, 230, and the cache 210 are coupled together via a bus internal to the module 201. Communications between the components 210, 220, 230, inside the module 201 and external devices are through a bus interface 250. For this embodiment, the bus 250 is coupled to chipset logic 240. The chipset 240 of this embodiment includes interrupt logic 241 having a TPR table 242 and a state info table 243. The TPR table 242 and state info table 243 can be generic memory storage locations such as registers to retain data or information. The term "registers" is used herein to refer to the on-board processor storage locations that are used as part of macro-instructions to identify operands. In other words, the registers referred to herein are those that are visible from the outside of the processor or component (from a programmer's perspective). However, the registers described herein can be implemented by circuitry within a component using any number of different techniques, such as dedicated physical registers, dynamically allocated physical registers using register renaming, combinations of dedicated and dynamically allocated physical registers, etc.

During system operation, data is communicated among the processors 220, 230, the cache 210, and the chipset 240. Furthermore, the chipset 240 propagates interrupt requests from various system devices to the processor cores 220, 230, for processing as needed. For this embodiment, the chipset takes into account the processor power state, in addition to the processor priority when distributing interrupts. Each processor core 220, 230, of this module 201 stores its priority level and its power state in its respective TPR 224, 234. The processor priority value indicates the priority of operations of a specific processor and the tolerance of the processor for interruptions. Furthermore, the processor priority value can indicate the hierarchy of importance and control relative to other available processors in the system. For example, a processor of priority '0' can be the master processor in the system. High priority interrupts such as a clock interrupt or a non-maskable interrupt (NMI) are routed to the master processor. Fixed delivery interrupts may also be designated for a specify processor. A processor with a high task priority value may indicate a processor task that should not be interrupted. For example, if a processor is executing a system critical function, the processor can set its task priority value to an appropriate value to avoid interruptions. Other processors having lower priority value may be performing less critical functions and also more amenable to being interrupted to handle low priority interrupt requests.

Similarly, the power state value indicates which power region the particular processor core is operating. For example, a processor can be 'powered on and busy', 'powered on and idle', 'halted', 'stop grant', 'deep sleep', 'deeper sleep' or 'powered down'. Depending on which power state a processor is in, a request to service an interrupt can have different power implications and completion time. The cores 220, 230, of this example track the processor priority value and the processor power state in the TPRs 224, 234, within the interrupt logic 223, 233. The priority values and power states are communicated from the cores 220, 230, to the interrupt logic 241 of the chipset 240. The chipset interrupt logic 241 of this embodiment includes a TPR table 242 and a power state info table 243 to store for each processor in the system, the processor priority values and the processor power state values, respectively. Thus when the chipset interrupt logic 241 is deciding which processor to send an interrupt to, the task priority and state info in the respective tables 242, 243, are evaluated and taken into account. Depending on the allocation algorithm of the particular embodiment, an interrupt is sent to a specific processor. In one embodiment, interrupts are handled primarily by processors having a 'powered on and idle' or 'powered on and busy state', as 'sleeping' or 'powered down' cores have undesirable power and latency impacts. In one embodiment, each piece of information for each processor is stored in its own unique register.

Figure 3:
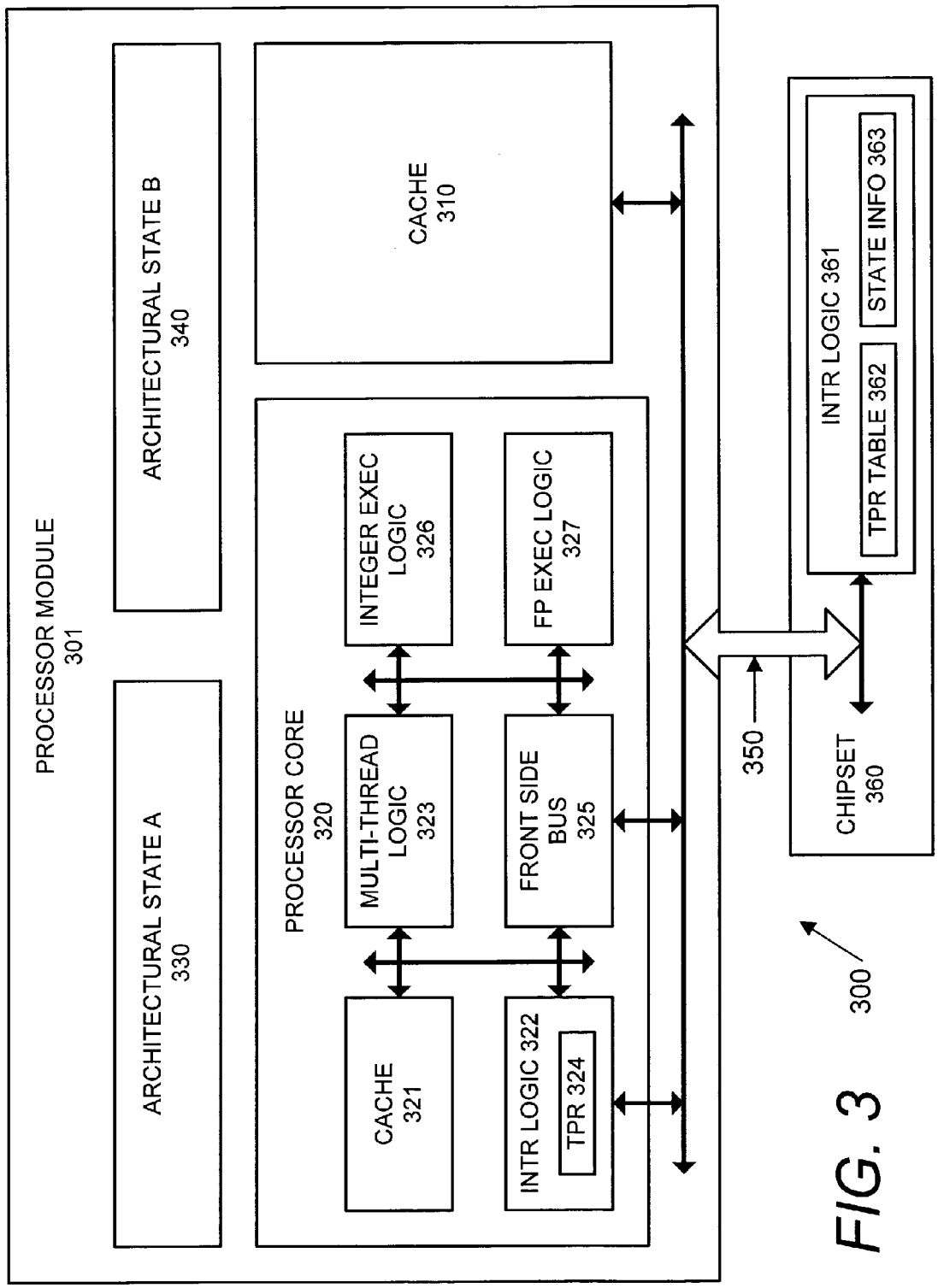
FIG. 3 is a block diagram of a multi-threading processor and associated chipset that include another embodiment of a power state aware interrupt mechanism in accordance with the present invention.

FIG. 3 is a block diagram 300 of a multi-threading processor 301 and associated chipset 360 that include another embodiment of a power state aware interrupt mechanism in accordance with the present invention. The processor module 301 of this embodiment includes a single processor core 320 and a cache memory 310. This core 320 is comprised of an on-chip cache 321, interrupt logic 322, multi-thread logic 323, front side bus logic 325, integer execution logic 326, and floating point execution logic 327. Within the interrupt logic is a TPR 324 as described above with the example of FIG. 2. The processor core 320 and cache 310 are coupled together with chipset logic 360 through an external bus 350. The chipset 360 includes interrupt logic 361 that maintains a TPR table 362 and a power state info table 363. Although the TPR table 362 and state info table 363 are shown as separate entities, the processor priority and power state information can be stored together in a consolidated data structure in another embodiment. Furthermore, priority and power state information can also be combined into a single representative value for each processor to indicate relative desirability and/or priority in the distribution of interrupts to processors for handling.

In this embodiment, a single physical processor core is present. However, the multi-threading logic 323 allows multiple instruction threads to be processed in parallel on a single set of architecture resources through resource sharing. For example, the processor module 301 of the example is capable of processing two threads, A and B, at the same time. Threads A and B each maintain its own architectural states A 330 and B 340, but utilize the physical processor core resources through a resource sharing algorithm. In addition to physical multi-threading logic 323, the operating system (such as Windows, UNIX, or Linux, as described earlier) is also enabled to issue multiple threads or execute simultaneous programs. In some multi-processor systems, the operating system uses a lowest priority interrupt delivery as the default algorithm for all device interrupts. From a user and operating system perspective, the system 300 appears to have multiple, two in this example, logic processor units. Architectural states A 330 and B 340 are shown here for illustrative purposes and do not represent actual physical logic blocks on the processor module 301. The architectural states A 330 and B 340 of this example include the respective processor registers of each thread. For one embodiment, the architectural state includes registers such as general purpose registers, control registers, advanced programmable interrupt controller (APIC) registers, and some machine state registers. The data, settings, etc. of each architectural state can be stored in a memory region on the processor 301.

For this embodiment, the TPR table 362 and the power state info table 363 track the relevant values for the logic processors. For example, like the physical processor cores 220, 230, of the previous example above, each architectural state 330, 340, of logical processors in this example has a task priority value and a power state value. The task priority value in this case also reflects the relative importance of the task of that thread and the tolerance for interruptions. Whereas the power state values of the FIG. 2 example communicated physical power settings, the power state values for an architectural state of this embodiment indicates the type of thread activity and correspondingly, the amount of power consumption. For example, a thread may have a 'busy' status to indicate that the thread is active and executing. Or a thread may have a 'idle' or 'halted' status to indicate that the thread is not presently running or is waiting for something. Similarly, a thread may have a 'sleep' status to indicate that the thread is asleep and its architectural state is currently held inactive. By evaluating the processor power status in determining which logical processor to sent a interrupt service request to, the chipset can avoid waking a sleeping thread, which can be costly in time and power, if the power state of another thread is 'idle'. The chipset can also interrupt a thread with a 'busy' state to service an interrupt in lieu of activating a more costly thread.

Figure 4:
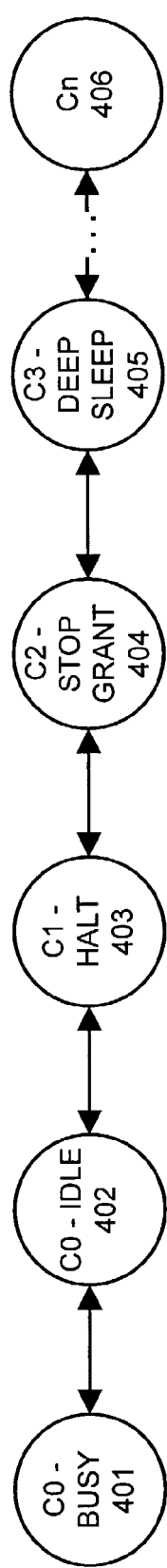
FIG. 4 illustrates the processor power states for one embodiment of the present invention.

FIG. 4 illustrates the processor power states (C-states in the ACPI specifications) for one embodiment of the present invention. For this embodiment, the processor power states extend from C0-BUSY 401 through Cn 406, wherein the lower the suffix number with 'C', the lower the amount of additional overhead power needed in order to service an interrupt. The C0 level includes both a busy state and an idle state, because the processor is powered on in both cases and is either executing user/kernel code or is ready to execute code. Similarly, a thread can be either running (busy) or idle (looping) idly. The hierarchy of power states in this implementation, from the most active and requiring the minimal amount of power to bring active, are: C0-BUSY 401, C0-IDLE 402, C1-HALT/WAIT 403, C2-STOP GRANT 404, C3-DEEP SLEEP 405, and Cn 406. The Cn power state 406 here is an arbitrary power state at the bottom of the hierarchy and takes a large, relative to the other power states, amount of time and power before being able to service an interrupt. The number of available power states can vary depending on the particular embodiment. The terms processor and thread are used interchangeably here such that a thread is also in reference to a logical processor.

For one embodiment of the present invention, the chipset interrupt logic evaluates the processor power states received from the various processors to determine a relative list. In this embodiment, the C0-IDLE 402 state is preferred over the C0-BUSY 401 state as both states indicate a processor or thread that can handle an interrupt with little or no overhead. However, a processor/thread that is busy would have to interrupt the currently running task and possibly save the architectural state before servicing the interrupt request, while a processor/thread that is idle could take on the interrupt request immediately with even less overhead. With a processor/thread that is stopped or sleeping, as in C2 404 or C3 405, respectively, the processor/thread would have to be awoken and its architectural state restored, which can require varying amounts of time. Furthermore, waking up a sleeping processor/thread can also require a bit of power to restart or activate the necessary hardware logic. Therefore, the less active the processor, the greater the cost in terms of time and power in order for that processor to be ready to service an interrupt. Thus the chipset interrupt logic can be configured to select the optimal processor to handle an interrupt request based on a combination of factors including the processor power state and processor task priority.

Figure 5:
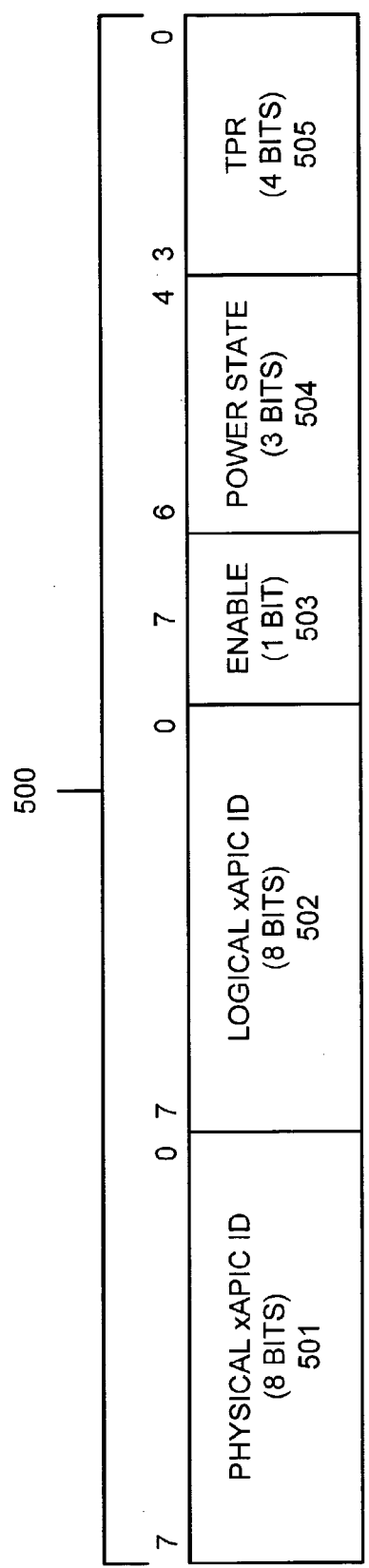
FIG. 5 is a diagram of a processor task information table entry for a chipset of one embodiment.

FIG. 5 is a diagram of a processor task information table entry 500 for a chipset of one embodiment. The entries 500 can be stored in a variety of memory locations including registers, latches, etc. For this embodiment, each entry is composed of five fields across three bytes of data and stores information as to a processor task priority and processor power state. The first field of the entry 500 in this example is a physical Advance Programmable Interrupt Controller (xAPIC) identifier 501. The physical xAPIC ID 501 of this embodiment identifies the physical processor for which this entry is associated. This first field of one embodiment is employed where multiple processors or multiple processor cores are physically present in the system. A second field of each entry 500 is a logical xAPIC ID 502. The logical xAPIC ID 502 of this embodiment identifies the logical processor or thread for which this entry is associated. This logical ID field 502 is programmed by the operating system in this implementation.

The third field of the TPR entry 500 in this embodiment is to hold an enable flag indicating whether this particular entry is valid or not. The enable field can also be used to indicate whether the processor/thread is capable of handling interrupts. If a processor entry is not enabled, the processor may not be available or is not active. For this embodiment, a fourth field is for holding the power state 504 of this processor. However, in alternative embodiments, this field may be reserved or not present as the interrupt logic may merge the power state values and the processor priority values into a unified value. The fifth field of this embodiment is to store a TPR value 505 for this processor. The TPR value is to indicate the task priority at the present processor. The algorithm for the interrupt logic of this embodiment is configured to not interrupt a task having a higher priority than that of the interrupt request and to search for another possible processor. But if the interrupt request has a priority greater than the present task, the task can be interrupted to service the interrupt. As for an interrupt having a priority level equal to that of the present task, the logic can interrupt the task if another processor with a lower priority task is not available.

In an alternative embodiment, the TPR field 505 can be configured to hold an overall power and task priority value from which the interrupt distribution logic can evaluate when searching for a processor. Although the fields of this example in FIG. 5 are illustrated with example field lengths and field locations, the entries and structure of the task priority table depend on the particular implementation of the present invention. The table entry shown in FIG. 5 has been described in the environment of the chipset logic. However, similar types of structures can reside with each individual processor and with the operating system to track the task priority values and power state values of each physical and/or logical processor available.

Figure 6A:
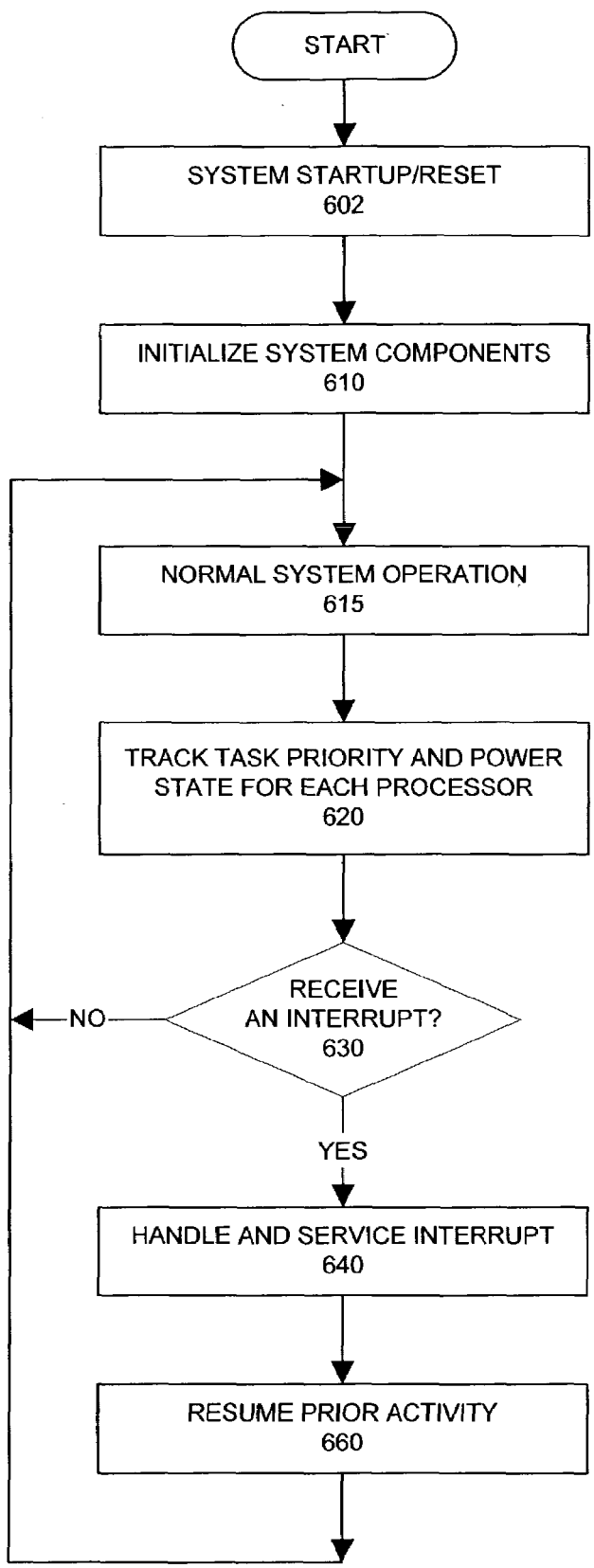
FIGS. 6A–D are flow charts illustrating one embodiment of a power state aware method for distributing interrupts.

FIGS. 6A–D are flow charts illustrating one embodiment of a power state aware method for distributing interrupts. The flow chart of FIG. 6A illustrates the high level method for power state aware interrupt distribution of one embodiment. At block 602, the system is started up or reset. The system components exit reset and are initialized at block 610. Example of such system components (i.e. processors, chipset, memory, I/O devices) can be found in FIG. 1 above. The operating system is also initialized and loaded. During the start up process, the operating system can configure the various system devices for proper operation. In one embodiment, the operation system is capable of multi-tasking and of running multiple threads concurrently. Depending on the particular implementation, the operating system may run the multiple threads on a number of logical processors or on physical processors/cores, if available. At block 615, the system enters normal operation. During normal system operation, various types of user applications and system tasks are performed by the system. The task priority and power state of each processor is tracked at block 620. The tracking can include gathering information about task priority, power state, and/or activity state of various physical and/or logic processors. At block 630, a check is made to determine whether any interrupt requests have been received. If no interrupt requests are detected at block 630, the system continues normal operations at 615.

If an interrupt request is detected at block 630, chipset interrupt logic handles the request and determines where to send the request to for servicing. Based on an analysis of factors including, but not limited to, the task priority values and power state values for the logical/physical processors, the interrupt logic selects an appropriate processor and communicates the interrupt request. The recipient processor services the interrupt request and then resumes its prior activities at block 660. Normal system operations continue at block 615 until another interrupt request is detected.

Figure 6B:
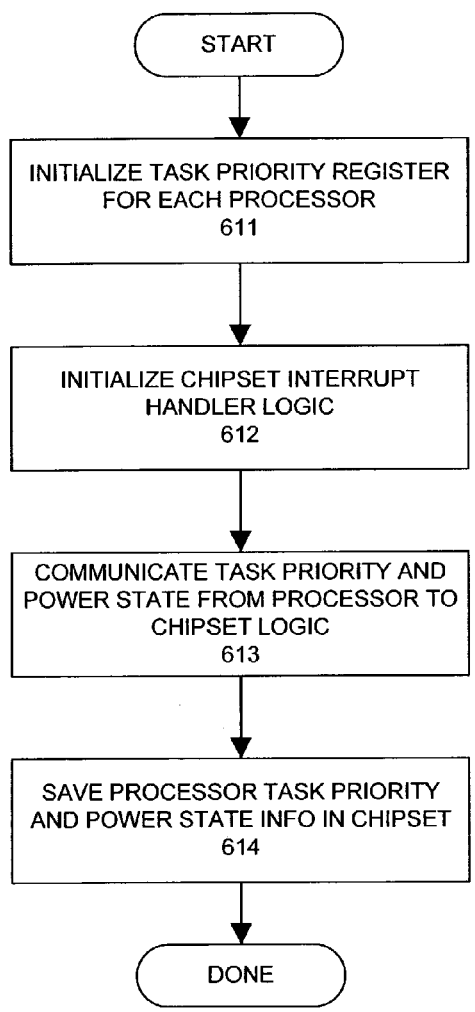

FIG. 6B is a flow chart further illustrating the operations happening during the initialization process of block 610. At block 611, the task priority register for each processor is initialized. The chipset interrupt handler logic is also initialized at block 612. Each processor communicates its task priority and power state to the chipset logic at block 613. The processor task priority and processor power state information are saved with the chipset logic at block 614 for later reference when interrupt requests need to be serviced. The task priority and power state information are updated accordingly whenever the task or power level changes at a processor.

Figure 6C:
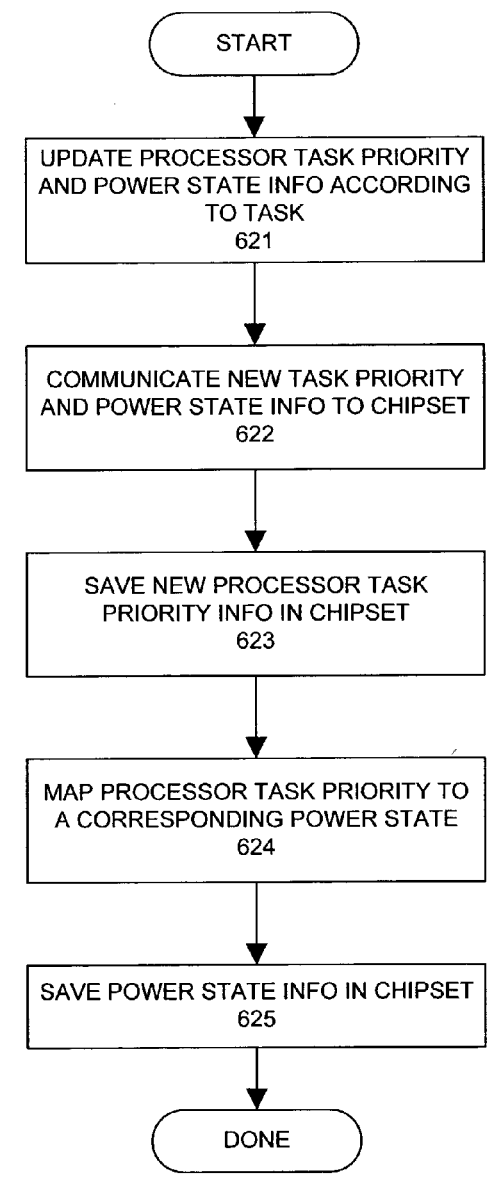

The flow chart of FIG. 6C illustrates in greater detail some of the operations during the processor task tracking of block 620. At block 621, the task priority register in the processor is updated with a task priority value and a power state value. For one embodiment, the task priority register stores both values. In another embodiment, the values are stores in different registers. In yet another embodiment, the task priority register stores a unified value based on both values. The new task priority and power state information is communicated to the chipset at block 622. At block 623, the chipset logic saves the task priority information into an entry for the processor in a task information table. The chipset of this embodiment can track task information for a number of physical/logical processors in the system. Each entry in the table is mapped to a specific processor. For this embodiment, the chipset logic also maps the processor task priority to a corresponding power state at block 624. The power state information received from the processor for that task is saved into the task information table.

Figure 6D:
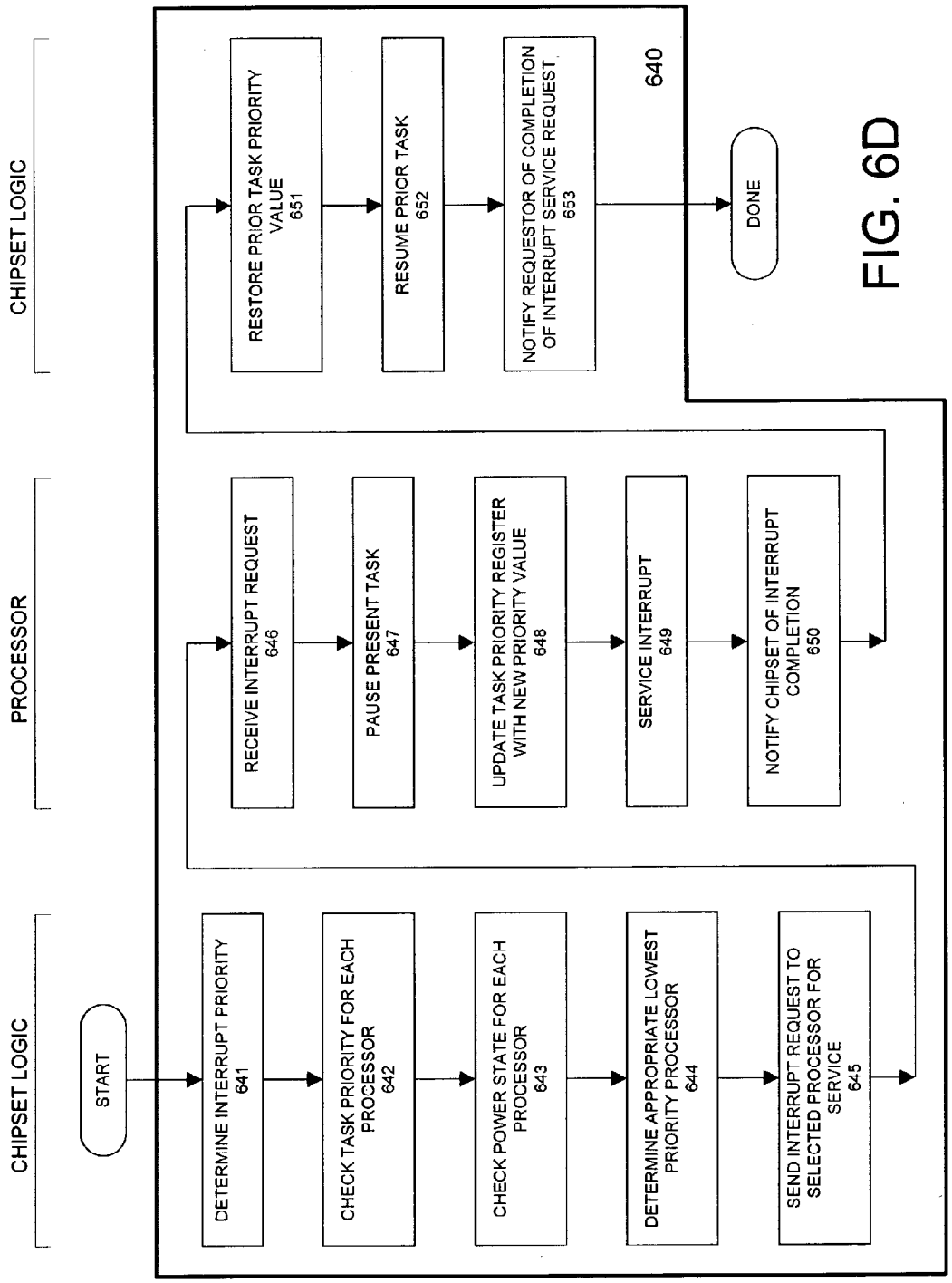

FIG. 6D is a flow chart illustrating the activities at the chipset logic and processor when an interrupt request is received at block 630 and serviced at block 640 for one embodiment of the present invention. For this embodiment, blocks 641–645 and 651–653 occur generally at the chipset, while block 646–650 generally happen at a processor. At block 641, the chipset interrupt logic determines the interrupt priority. The logic checks the task priority for each processor at block 642. The power state for each processor is also checked at block 643. Based on an algorithm that takes into account the task priority level and the power state, the chipset interrupt logic selects a processor to service the request at block 644 and sends the interrupt request to the processor at block 645. The chipset logic of this embodiment also updates the processor task entry to note the interrupt priority and that the processor is handling that interrupt.

The interrupt request is received at the selected processor at block 646. The processor pauses its present task at block 647, if there is a task currently in process. At block 648, the task priority entry for that processor is updated with a new priority value. For one embodiment, the task priority entry is updated at a physical register location on the processor and at the chipset. In another embodiment, the task priority entry at a memory structure maintained by the operating system is updated. At block 649, the processor services the interrupt. The processor notifies the chipset at block 650 of the completion of the interrupt service request and updates the processor task priority value to that of the interrupted task. The chipset receives the interrupt completion notification and the restored task priority value at block 651. The processor info table is updated with the task priority. The processor resumes the task that was in process before the interrupt and the chipset continues its operations at block 652. The chipset also notifies the requestor of the completion of the interrupt service request at block 653.

Figure 7:
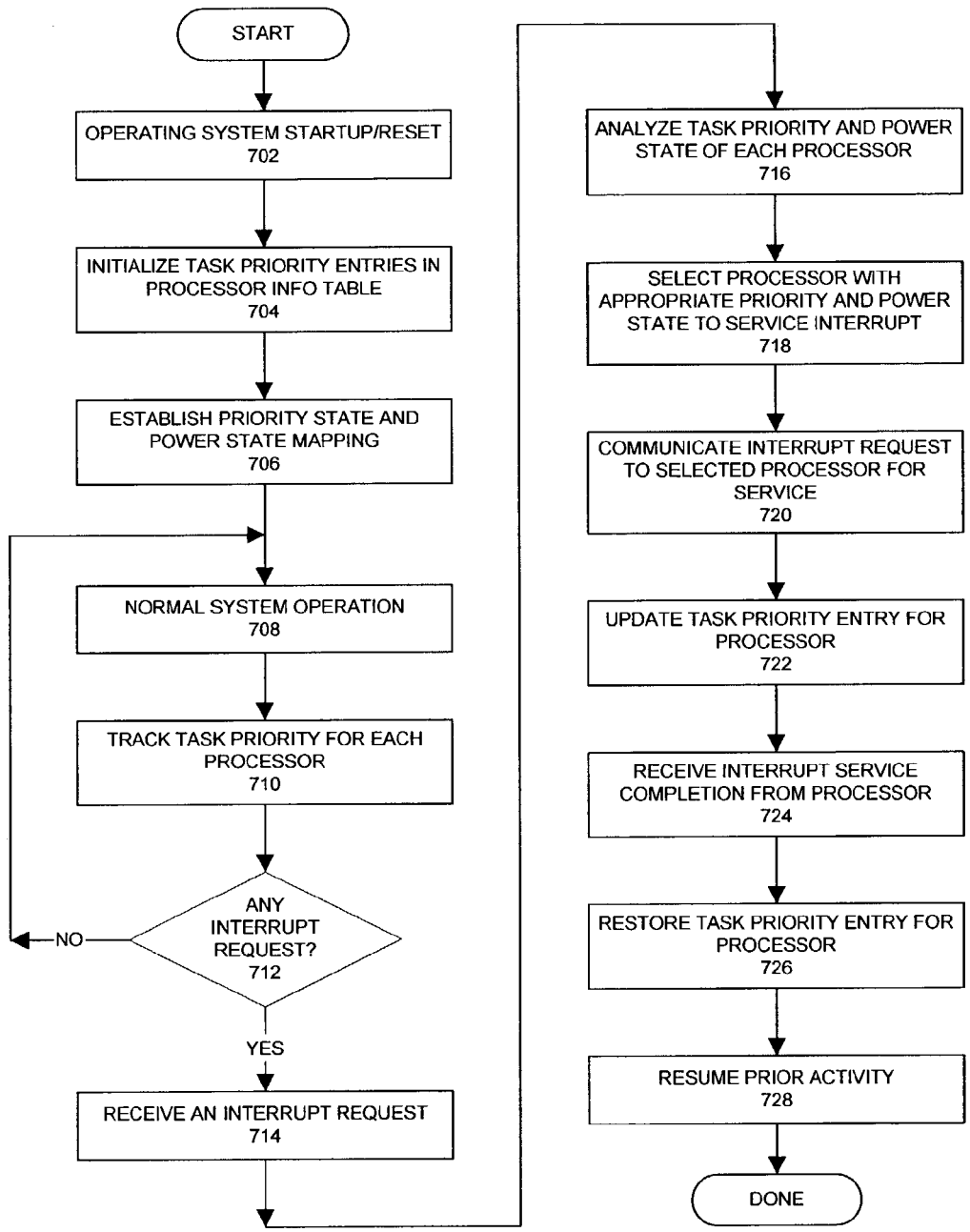
FIG. 7 is a flow chart illustrating another embodiment of a method for the processor power state aware distribution of interrupts.

FIG. 7 is a flow chart illustrating another embodiment of a method for the processor power state aware distribution of interrupts. The method of this embodiment is implemented with the operating system and operates via various control signals and instructions. In one implementation, firmware is used to translate or communicate the control signals between the software and hardware components. At block 702, the operating system is started up or reset. The task priority entries in the processor information table that is maintained by the operating system is initialized at block 704. For this embodiment, a mapping between task priority states and power states is established at block 706. The task priority entries of this embodiment incorporate the processor task priority value and processor power state value into a single reference value.

At block 708, normal system operations begin. The operating system tracks the task priority of the active task for each physical and logical processor in the system at block 710. At block 712, the operating system queries as to whether any interrupt requests have been received. If no interrupt requests are outstanding, normal system operation continues at block 708. User applications and system tasks continue running. But if an interrupt request is pending, the operating system receives the request at block 714 for distribution. At block 716, the operating system analyzes the task priority and power state values stored in the information table for each processor. The operating system at block 718 selects a processor with the appropriate priority and power state to service the interrupt request. For one embodiment, the appropriate processor is one having the lowest priority task and the highest priority state. In other words, the processor with the minimum time latency and minimum overhead power requirement before a request can be serviced is chosen.

In one embodiment, critical tasks or high priority tasks are typically not interrupted to service a lower priority interrupt. Similarly, a processor that is some type of sleep mode may be an undesirable candidate to service an interrupt request because waking up the processor can be cost in terms of both power and time. At block 720, the interrupt request is communicated to the selected processor for service. The task priority entry for that processor is updated to reflect the priority of the interrupt request at block 722. The target processor receives and handles the request. At block 724, the operating system is notified of the request completion. The task priority entry is restored for the processor at block 726. For one embodiment, the processor at block 728 resumes operation with the task that was at hand when the recent interrupt request was received.

Although the above examples describe the interrupts handling and distribution in the context of execution units and logic circuits, other embodiments of the present invention can be accomplished by way of software. Such software can be stored within a memory in the system. Similarly, the code can be distributed via a network or by way of other computer readable media. For instance, a computer program may be distributed through a computer readable medium such as a floppy disk or a CD ROM, or even a transmission over the Internet. Thus, a machine-readable medium can include any mechanism for storing or transmitting information in a form readable by a machine (e.g., a computer). For example, a machine-readable medium can include a read only memory (ROM), random access memory (RAM), magnetic disk storage media, optical storage media, flash memory devices, and electrical, optical, acoustical or other forms of propagated signals (e.g., carrier waves, infrared signals, digital signals, etc.).

Furthermore, embodiments of integrated circuit designs in accordance with the present inventions can be communicated or transferred in electronic form. For example, the electronic form of an integrated circuit design of a processor in one embodiment can be processed or manufactured via a fab to obtain a computer component. In another instance, an integrated circuit design in electronic form can be processed by a machine to simulate a computer component. Thus the circuit layout plans and/or designs of processors in some embodiments can be distributed via machine readable mediums or embodied thereon for fabrication into a circuit or for simulation of an integrated circuit which, when processed by a machine, simulates a processor. A machine readable medium is also capable of storing data representing predetermined functions in accordance with the present invention in other embodiments.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method comprising:
   receiving first power state information from a first component, said first power state information being information representing the power state of said first component, and second power state information from a second component, said second power state information being information representing the power state of said second component;

receiving first task priority information from said first component and second task priority from said second component;

receiving an interrupt request from a first device for servicing;

evaluating power state and task priority information for said first and second components to determine which component should service said interrupt request;

selecting either said first component or said second component to be a destination component to service said interrupt request based on said power state and task priority information; and communicating said interrupt request to said destination component.

2. The method of claim 1 further comprising storing said first power state information in a first memory location and said second power state information in a second memory location.

3. The method of claim 2 further comprising storing said first task priority information in a third memory location and said second task priority information in a fourth memory location.

4. The method of claim 3 further comprising checking devices for interrupt requests.

5. The method of claim 4 further comprising updating power state and task priority information for said destination component to reflect a ask priority of said interrupt request.

6. The method of claim 5 further comprising receiving notification of interrupt completion from said destination component.

7. The method of claim 6 further comprising restoring said power state and task priority information for said destination component to values that existed prior to servicing said interrupt request.

8. The method of claim 7 further comprising informing said device of said interrupt completion.

9. The method of claim 8 wherein said first and second components are processors.

10. The method of claim 9 wherein said first, second, third, and fourth memory locations are located within chipset logic.

11. An apparatus comprising:
interrupt handling logic coupled to a first set of signal lines to receive an interrupt request, said first set of signal lines coupled to one or more devices that can generate interrupt requests;

a bus interface to interact with a bus coupled to a first component and a second component, wherein said interrupt handling logic is coupled to said first bus through said bus interface to receive power state information and task priority information for each of said first and second components, said power state information being information representing the power state of said components;

evaluation logic coupled said interrupt handling logic, wherein when said interrupt handling logic receives said interrupt request, said evaluation logic is to evaluate power state and task priority information for said first and second components to determine which component should service said interrupt request; and selection logic coupled to said evaluation logic to select either said first component or said second component to be a destination component to service said interrupt request based on said power state and task priority information.

12. The apparatus of claim 11 further comprising memory to store said power state information and said task priority information for each of said first and second components for reference by said evaluation logic.

13. The apparatus of claim 12 wherein said selection logic is to further communicate said interrupt request to said destination component for servicing.

14. The apparatus of claim 13 wherein said selection logic is to further update power state and task priority information for said destination component to reflect a task priority of said interrupt request.

15. The apparatus of claim 14 wherein said interrupt handling logic is to further receive notification of interrupt completion from said destination component.

16. The apparatus of claim 15 wherein said selection logic is to further restore said power state and task priority information for said destination component to values that existed prior to servicing said interrupt request.

17. The apparatus of claim 16 wherein interrupt handling logic is to further inform said device of said interrupt completion.

18. The apparatus of claim 17 wherein said first and second components are processors.

19. The apparatus of claim 17 wherein said first and second components execute threads of a multi-threading environment.

20. The apparatus of claim 19 wherein said apparatus is a chipset.

21. A system comprising:
a bus;
a first component and a second component coupled to said bus;
one or more system devices that can generate interrupt requests, wherein said interrupt requests require service from either said first or second component;
a chipset to handle said interrupt requests, said chipset coupled to said systems devices and to said first and second components, wherein said chipset is to receive power state information and task priority information for each of said first and second components, said power state information being information representing the power state of said first and second components, said chipset to evaluate said power state and task priority information when an interrupt request is received and to determine which component should service said interrupt request, and wherein said chipset selects either said first component or said second component to service said request based an said power state and task priority information.

22. The system of claim 21 wherein said chipset further comprises memory registers to store said power state information and said task priority information for each of said first and second components for reference by said evaluation logic.

23. The system of claim 22 wherein said chipset further comprises logic to update power state and task priority information for said destination component to reflect a task priority of said interrupt request.

24. The system of claim 22 wherein said chipset further comprises logic to track power state and task priority information for each of said first and second component.

25. The system of claim 22 wherein said chipset receives notification of completion of said interrupt request from a component selected to service said interrupt request.

26. The system of claim 25 wherein said chipset further comprises logic to restore said power state and task priority information for said component selected to service said interrupt request to values that existed prior to servicing said interrupt request.

27. The system of claim 26 wherein said first and second components are each multi-threading processors.

28. The system of claim 26 wherein said first and second components are each processing cores of a multi-core module.

29. A method comprising:
receiving first power state information from a first component, said first power state information being information representing the power state of said first component, and second power state information from a second component, said second power state information being information representing the power state of said second component;
assigning a first task priority value to said first component based on said first power state information;
assigning a second task priority value to said second component based on said second power state information;
receiving an interrupt request from a first device for servicing;
evaluating task priority values for said first and second components to determine which component should service said interrupt request;
selecting either said first component or said second component to be a destination component to service said interrupt request based on said task priority values; and
communicating said interrupt request to said destination component.

30. The method of claim 29 further comprising storing said first and second task priority values to a first and second registers.

31. The method of claim 30 wherein each power state information comprises a power state value.

32. The method of claim 31 wherein each power state value corresponds to a task priority value.

33. The method of claim 32 wherein a higher power state value corresponds to lower task priority value and a lower power state value corresponds to a higher task priority value.

34. The method of claim 33 a component with a lower task priority value is more preferably selected to be said destination component to service said interrupt request than another component with a higher task priority value.

35. The method of claim 34 wherein said first and second components are a first processor and a second processor, respectively.

36. The method of claim 35 wherein each of task priority values are stored to a unique register.

* * * * *